US008932471B2

(12) United States Patent
Chou et al.

(10) Patent No.: US 8,932,471 B2
(45) Date of Patent: Jan. 13, 2015

(54) METHOD OF RECOVERING AND CONCENTRATING AN AQUEOUS N-METHYLMORPHOLINE-N-OXIDE (NMMO) SOLUTION

(75) Inventors: Wen-Tung Chou, Changhua County (TW); Ming-Yi Lai, Changhua County (TW); Kun-Shan Huang, Tainan (TW); Hsiao-Chi Tsai, Pingtung (TW); Chih-Chung Kuo, Changhua County (TW)

(73) Assignee: Acelon Chemicals & Fiber Corporation, Changhua Hsien (TW)

( * ) Notice: Subject to any disclaimer, the term of this patent is extended or adjusted under 35 U.S.C. 154(b) by 673 days.

(21) Appl. No.: 13/228,946

(22) Filed: Sep. 9, 2011

(65) Prior Publication Data

US 2013/0062566 A1 Mar. 14, 2013

(51) Int. Cl.
*B01D 17/00* (2006.01)
*B01D 1/26* (2006.01)
*D01F 13/02* (2006.01)

(52) U.S. Cl.
CPC . *B01D 1/26* (2013.01); *D01F 13/02* (2013.01)
USPC ............................ 210/774; 210/739; 252/364

(58) Field of Classification Search
USPC .................. 252/364; 210/651, 663, 739, 774
See application file for complete search history.

(56) References Cited

FOREIGN PATENT DOCUMENTS

| CN | 1049460 | 2/1991 |
| CN | 2686688 | 3/2005 |
| CN | 101280476 | 10/2008 |

OTHER PUBLICATIONS

Machine translation of CN101280476, 2014.*
Search Report from Office Action dated Sep. 17, 2013 issued in corresponding Chinese Application No. 201110108036.8 with English Translation.

* cited by examiner

*Primary Examiner* — Mark Kopec
*Assistant Examiner* — Haidung Nguyen
(74) *Attorney, Agent, or Firm* — Fish & Richardson P.C.

(57) ABSTRACT

This disclosure relates to a method of recovering and concentrating an aqueous N-methylmorpholine-N-oxide (NMMO) solution.

2 Claims, 4 Drawing Sheets

METHOD OF RECOVERING AND CONCENTRATING AN AQUEOUS N-METHYLMORPHOLINE-N-OXIDE (NMMO) SOLUTION

BACKGROUND OF THE INVENTION

1. Field of the Invention

This invention relates to a method of recovering and concentrating an aqueous N-methylmorpholine-N-oxide (NMMO) solution.

2. Description of the Related Art

NMMO (N-methylmorpholine-N-oxide) is a nontoxic organic solvent, and is used in lyocell filament production. Due to the high cost of NMMO, NMMO is usually recovered from and reused in the lyocell filament production.

A conventional method of producing lyocell filaments includes steps of: dissolving cellulose pulp in an aqueous N-methylmorpholine-N-oxide (NMMO) solution so as to obtain a spinning solution, and manufacturing lyocell filaments from the spinning solution by a spinning process. When the spinning process is conducted, the spinning solution is extruded through a spinning funnel into a coagulating bath. In the coagulating bath, the NMMO is extracted from the extruded spinning solution to water to obtain an aqueous NMMO waste solution, such that the lyocell filaments are formed. Subsequently, the lyocell filaments are washed with water to remove residual NMMO (washing step). The aqueous NMMO waste solutions obtained from the coagulating bath and the washing step are collected, recovered and concentrated for recycling.

FIG. 1 illustrates a triple effect evaporator that is used in a method for recovering and concentrating the NMMO solution. The triple effect evaporator includes serially connected first, second and third effect evaporators 11, 12, 13 and a condenser 14. The aqueous NMMO solution is sequentially concentrated using the first, second and third effect evaporators 11, 12, 13 to obtain first, second and third concentrated aqueous NMMO solutions. In the conventional method of recovering and concentrating the aqueous NMMO solution, the evaporators 11, 12, 13 have to be maintained at an elevated temperature so as to evaporate the NMMO solution fed thereinto. The water vapor thus produced from the first effect evaporator 11 is introduced into the second effect evaporator 12 for heating the solution therein. In a similar manner, the water vapor thus produced from the second effect evaporator 12 is introduced into the third effect evaporator 13 for heating the solution therein. The water vapor produced from the third effect evaporator 13 is then cooled and liquefied by the condenser 14.

In the aforesaid conventional method, the first evaporator 11 generally has to be maintained at from 110 to 120° C. Meanwhile, the NMMO solution to be fed into the first evaporator 11 also has to be heated to a relatively high temperature. Thus, a large amount of external heat is required. In addition, since the water vapor produced from the third effect evaporator 13 is required to be cooled, cooling water or a cooling device is required.

SUMMARY OF THE INVENTION

Therefore, the object of the present invention is to provide a method of recovering and concentrating an aqueous N-methylmorpholine-N-oxide (NMMO) solution that is energy conserving and has a better recycle efficiency.

A method of recovering and concentrating an aqueous NMMO solution of this invention comprises the steps of: (a) introducing an aqueous NMMO solution, which has an NMMO concentration of less than 10 wt %, into a triple effect evaporator that includes serially connected first, second and third evaporation vessels; (b) concentrating the aqueous NMMO solution to obtain a first concentrated aqueous NMMO solution that has an NMMO concentration ranging from 10 wt % to 20 wt % using the first evaporation vessel, and transferring the first concentrated aqueous NMMO solution to the second evaporation vessel; (c) concentrating the first concentrated aqueous NMMO solution to obtain a second concentrated aqueous NMMO solution that has an NMMO concentration ranging from 22 wt % to 38 wt % using the second evaporation vessel, and transferring the second concentrated aqueous NMMO solution to the third evaporation vessel; and (d) concentrating the second concentrated aqueous NMMO solution to obtain a third concentrated aqueous NMMO solution that has an NMMO concentration higher than 50 wt % using the third evaporation vessel.

BRIEF DESCRIPTION OF THE DRAWINGS

The above and other features and advantages of the present invention will become apparent in the following detailed description of the preferred embodiment with reference to the accompanying drawings, of which.

DETAILED DESCRIPTION OF THE PREFERRED EMBODIMENT

Figure 1:
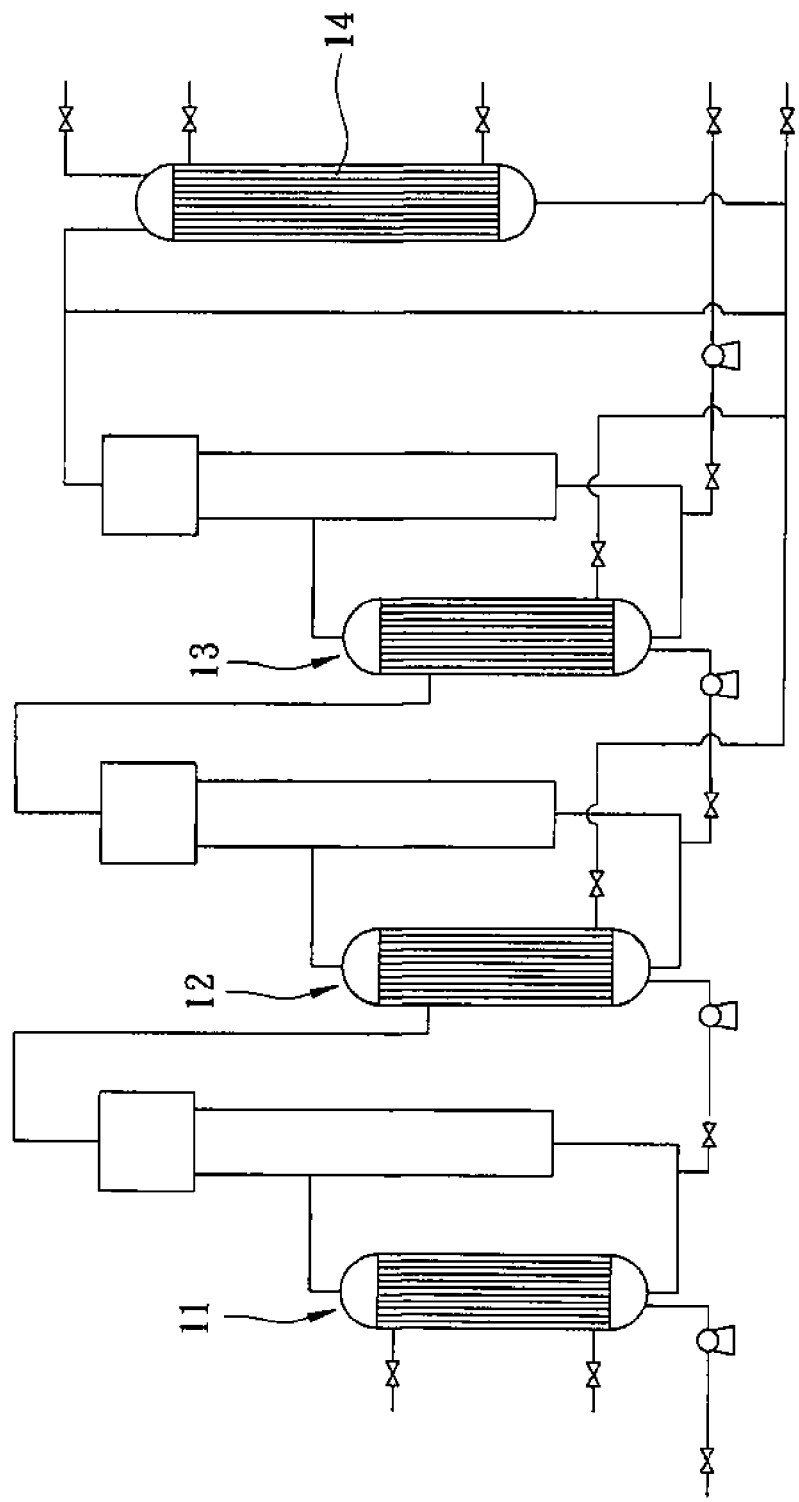
FIG. 1 is a schematic diagram of a conventional triple effect evaporator.
Figure 2:
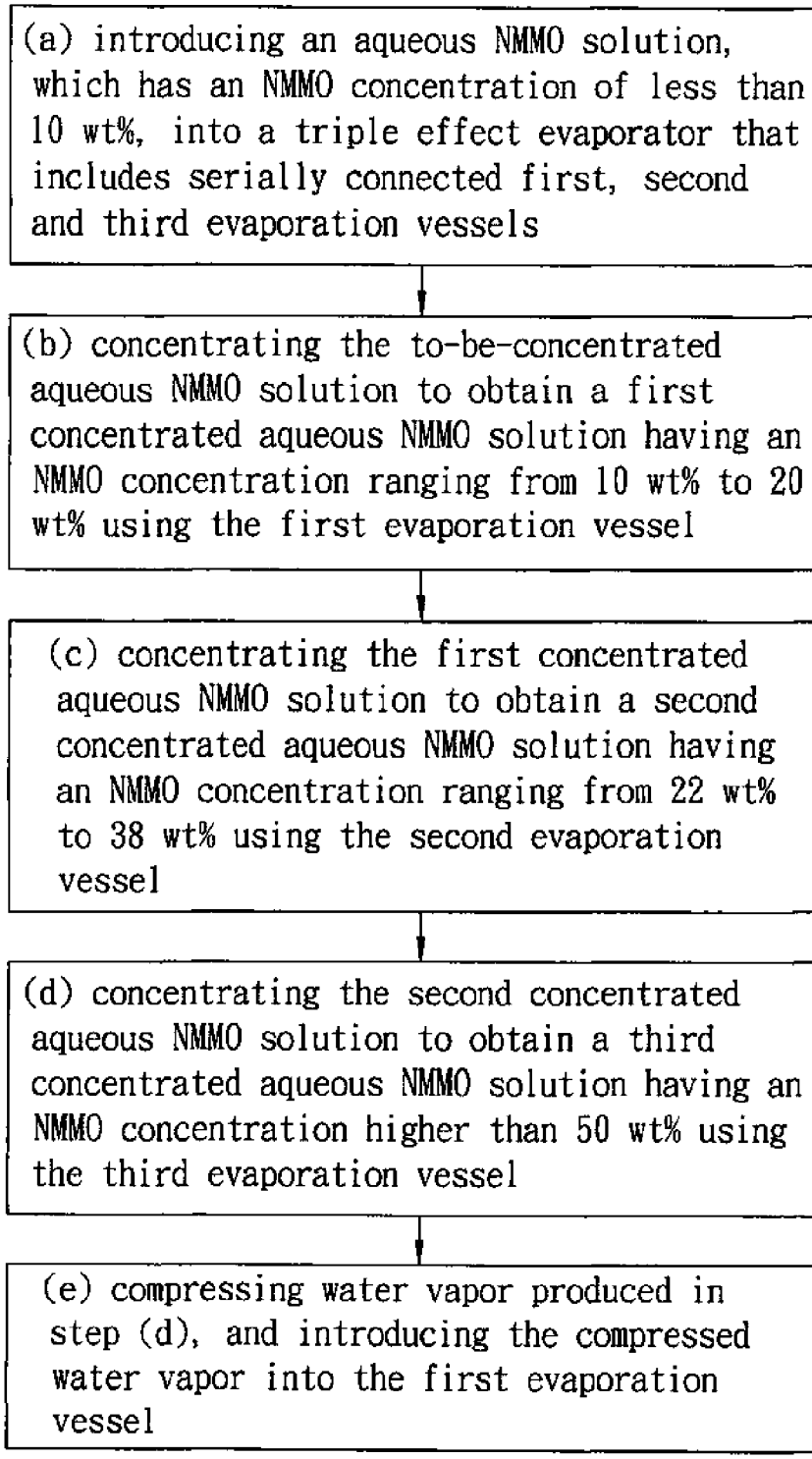
FIG. 2 is a flow chart to illustrate the preferred embodiment of a method of recovering and concentrating an aqueous NMMO (N-methylmorpholine-N-oxide) solution according to this invention.

FIG. 2 shows the preferred embodiment of a method of recovering and concentrating an aqueous N-methylmorpholine-N-oxide (NMMO) solution according to the present invention by which a concentrated aqueous NMMO solution having a concentration higher than 50% can be obtained.

The method of recovering and concentrating an aqueous NMMO solution comprises the steps of: (a) introducing an aqueous NMMO solution, which has an NMMO concentration of less than 10 wt %, into a triple effect evaporator that includes serially connected first, second and third evaporation vessels; (b) concentrating the to-be-concentrated aqueous NMMO solution to obtain a first concentrated aqueous NMMO solution having an NMMO concentration ranging from 10 wt % to 20 wt % using the first evaporation vessel, and transferring the first concentrated aqueous NMMO solution to the second evaporation vessel; (c) concentrating the first concentrated aqueous NMMO solution to obtain a second concentrated aqueous NMMO solution having an NMMO concentration ranging from 22 wt % to 38 wt % using the second evaporation vessel, and transferring the second concentrated aqueous NMMO solution to the third evaporation vessel; and (d) concentrating the second concentrated aqueous NMMO solution to obtain a third concentrated aqueous NMMO solution having an NMMO concentration higher than 50 wt % using the third evaporation vessel. The method of recovering and concentrating an aqueous NMMO solution further comprises (e) compressing water vapor produced in step (d), and introducing the compressed water vapor into the first evaporation vessel for recycling.

Figure 3:
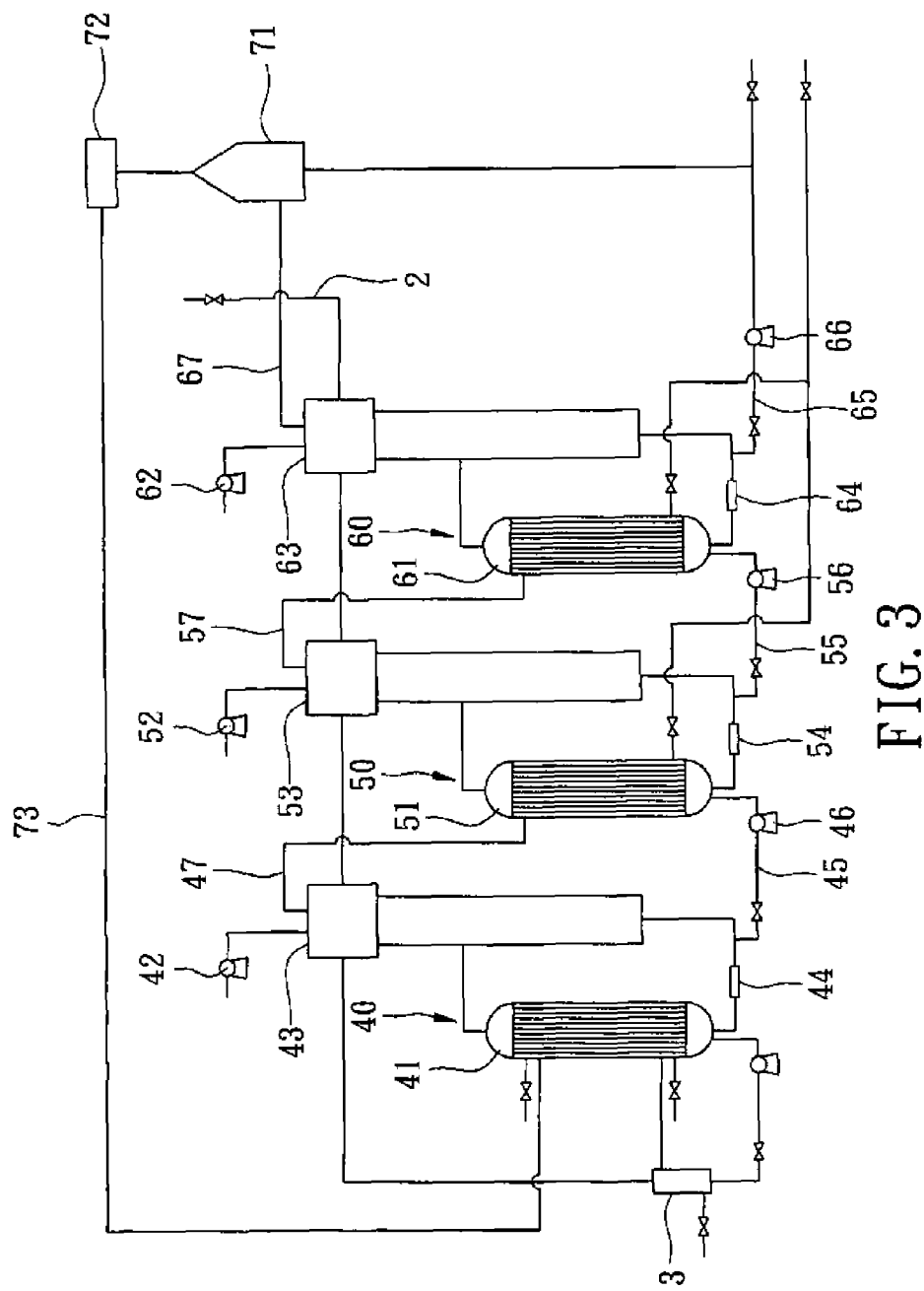
FIG. 3 is a schematic diagram of a modified triple effect evaporator that is used to carry out the preferred embodiment shown in FIG. 2.

The method of recovering and concentrating the aqueous NMMO solution is performed by a triple effect evaporator shown in FIG. 3. The triple effect evaporator comprises serially connected first, second and third effect evaporators 40, 50, 60 respectively including first, second and third evaporation vessels 41, 51, 61 and first, second and third vapor tanks 43, 53, 63. Each of the first, second and third evaporation vessels 41, 51, 61 is connected to a respective one of the first, second and third vapor tanks 43, 53, 63. Each of the first, second and third vapor tanks 43, 53, 63 respectively includes a vacuum pump 42, 52, 62 to reduce the pressure of each of the first, second and third vapor tanks 43, 53, 63.

The heating source for the NMMO solution is provided by water vapor produced from a main vapor source and the evaporation vessels 41, 51, 61. The water vapor produced from the main vapor source is introduced into the first evaporation vessel 41 so as to heat and evaporate the to-be-concentrated aqueous NMMO solution in the first evaporation vessel 91. The vapor including evaporated NMMO solution and water vapor produced by evaporating the to-be-concentrated aqueous NMMO solution in the first evaporation vessel 41 is fed into the first vapor tank 43, followed by separating the evaporated NMMO solution and water vapor by virtue of the difference in boiling point therebetween so as to obtain a first concentrated aqueous NMMO solution and water vapor. The water vapor is then introduced into the second evaporation vessel 51 via a conduit 47. Similarly, the vapor produced in the second evaporation vessel 51 is fed into the second vapor tank 53, followed by separating the evaporated NMMO solution and water vapor so as to obtain a second concentrated aqueous NMMO solution and water vapor. The water vapor is then introduced into the third evaporation vessel 61 via a conduit 57. The vapor produced in the third evaporation vessel 61 is fed into the third vapor tank 63, followed by separating the evaporated NMMO solution and water vapor so as to obtain a third concentrated aqueous NMMO solution and water vapor. The water vapor in the third vapor tank 63 is then introduced to a vapor/liquid separator 71 via a conduit 67 for further separation the NMMO solution from the water vapor. The water vapor is further compressed by a mechanical vapor compressor 72 so as to elevate the temperature thereof to a temperature equal to that of the water vapor fed into the first evaporation vessel 41 from the main vapor source. The water vapor with an elevated temperature is fed into the first evaporation vessel 41 via a conduit 73 and a heat exchanger 3 for heating the to-be-concentrated aqueous NMMO solution. Preferably, the to-be-concentrated aqueous NMMO solution is preheated in a feeding pipe 2 by passing the feeding pipe 2 through and contacting the first, second and third vapor tanks 43, 53, 63 and the heat exchanger 3 before the same is fed into the first evaporation vessel 41.

The first effect evaporator 40 further includes a first transfer conduit 45, a first concentration meter 44 used for measuring the concentration of the first concentrated aqueous NMMO solution being discharged from the first vapor tank 43, and a first liquid pump 46 used for pumping the first concentrated aqueous NMMO solution to the second evaporation vessel 51 via the first transfer conduit 45 when the concentration of the first concentrated aqueous NMMO solution measured by the first concentration meter 44 reaches a predetermined level. When the concentrated NMMO solution has a concentration less than the predetermined level, the same will flow back to the first evaporation vessel 41.

The second effect evaporator 50 further includes a second transfer conduit 55, a second concentration meter 54 used for measuring the concentration of the second concentrated aqueous NMMO solution being discharged from the second vapor tank 53, and a second liquid pump 56 used for pumping the second concentrated aqueous NMMO solution to the third evaporation vessel 61 via the second transfer conduit 55 when the concentration of the second concentrated aqueous NMMO solution measured by the second concentration meter 54 reaches a predetermined level. Similarly, when the concentrated NMMO solution has a concentration less than the predetermined level, the same will flow back to the second evaporation vessel 51.

The third effect evaporator 60 further includes a third transfer conduit 65, a third concentration meter 64 used for measuring the concentration of the third concentrated aqueous NMMO solution being discharged from the third vapor tank 63, and a third liquid pump 66 used for pumping the third concentrated aqueous NMMO solution to a storage tank (not shown).

EXAMPLE 1

A to-be-concentrated aqueous NMMO solution having a concentration of 3.92 wt % was introduced into the first evaporation vessel 41 of the first effect evaporator 40 and was concentrated to obtain a first concentrated aqueous NMMO solution having a concentration of 12 wt % at an operation temperature ranging from 70.0° C. to 73.0° C. under a reduced pressure of 600 mmHg. The first concentrated aqueous NMMO solution was introduced into the second evaporation vessel 51 of the second effect evaporator 50 and concentrated to obtain a second concentrated aqueous NMMO solution having a concentration of 28 wt % at an operation temperature ranging from 61.0° C. to 62.5° C. under a reduced pressure of 630 mmHg. The second concentrated aqueous NMMO solution was introduced into the third evaporation vessel 61 of the third effect evaporator 60 and concentrated to obtain a third concentrated aqueous NMMO solution having a concentration of 50.05 wt % at an operation temperature ranging from 51.8° C. to 52.2° C. under a reduced pressure of 650 mmHg. The volume and concentration of the to-be-concentrated aqueous NMMO solution, the volume and concentration of the third concentrated aqueous NMMO solution, and the recovery efficiency are shown in Table 2. Note that recovery efficiency is calculated based on the following equation.

$$\text{Recovery efficiency (\%)} = (C_2 \times V_2)/(C_1 \times V_1) \times 100\%$$

where $C_1$=the concentration (wt %) of the to-be-concentrated concentrated aqueous NMMO solution $V_1$=the volume (ton) of the to-be-concentrated concentrated aqueous NMMO solution $C_2$=the concentration (wt %) of the third concentrated aqueous NMMO solution $V_2$=the volume (ton) of the third concentrated aqueous NMMO solution.

EXAMPLES 2-9

The methods of recovering and concentrating an aqueous NMMO solution of Examples 2-9 were similar to that of Example 1, except for the parameters, i.e., concentration and temperature, listed in Table 1. It should be noted that the temperatures of the first, second and third evaporation vessels 41, 51, 61 were adjusted based on the desired concentrations of the first, second and third concentrated aqueous NMMO solutions, respectively. The concentration of the first concentrated aqueous NMMO solution was limited in a range from 10 wt % to 20 wt %, and the concentration of the second concentrated aqueous NMMO solution was limited in a range from 22 wt % to 38 wt %. The volume and concentration of the to-be-concentrated aqueous NMMO solution, the volume and concentration of the third concentrated aqueous NMMO solution, and the recovery efficiency for Examples 2-9 are shown in Table 2.

COMPARATIVE EXAMPLES 1-9

The methods of recovering and concentrating an aqueous NMMO solution of Comparative examples 1-9 (CP1-9) were similar to that of Example 1, except for the parameters listed in Table 1. In addition, in each of CP1-CP3, CP5, CP8 and CP9, the pressure in the first evaporation vessel was 610 mmHg, and, in each of CP4, CP6 and CP7, the pressure in the first evaporation vessel was 600 mmHg. In each of CP1, CP3, CP5, CP8 and CP9, the pressure in the second evaporation vessel was 630 mmHg, and, in each of CP2, CP4, CP6 and CP7, the pressure in the second evaporation vessel was 620 mmHg. In each of CP1-CP3, CP5, CP8 and CP9, the pressure in the third evaporation vessel was 650 mmHg, in CP4, the pressure in the third evaporation vessel was 660 mmHg, and in each of CP6 and CP7, the pressure in the third evaporation vessel was 680 mmHg. The concentrations of the first and second concentrated aqueous NMMO solutions were limited outside the range from 10 wt % to 20 wt % and the range from 22 wt % to 38 wt %, respectively. The temperatures of the first, second and third evaporation vessels 41, 51, 61 were adjusted to control the concentrations of the first, second, and third concentrated aqueous NMMO solutions. The volume and concentration of the to-be-concentrated aqueous NMMO solution, the volume and concentration of the third concentrated aqueous NMMO solution, and the recovery efficiency for CP1-9 are shown in Table 2.

TABLE 1

| | Evaporation vessel | | | | | |
|---|---|---|---|---|---|---|
| | First | | Second | | Third | |
| | Con.[1] (wt. %) | Temp. (° C.) | Con.[2] (wt. %) | Temp. (° C.) | Con.[3] (wt. %) | Temp. (° C.) |
| Exp. | | | | | | |
| 1 | 12 | 70.0-73.0 | 28 | 61.0-62.5 | 50.05 | 51.8-52.2 |
| 2 | 16.3 | 71.3-72.2 | 28.3 | 61.1-63.0 | 50.25 | 51.1-52.8 |
| 3 | 12.8 | 71.9-73.0 | 25.2 | 61.1-62.3 | 50.95 | 52.9-53.1 |
| 4 | 15.1 | 72.1-73.3 | 30.3 | 62.3-63.5 | 50.58 | 52.9-54.1 |
| 5 | 15.9 | 70.0-72.1 | 35.1 | 60.9-62.1 | 50.36 | 51.3-52.2 |
| 6 | 13.3 | 71.0-73.5 | 28.2 | 60.5-61.8 | 50.06 | 52.7-53.8 |
| 7 | 15.1 | 72.5-74.1 | 31.6 | 61.5-62.4 | 50.80 | 52.9-53.1 |
| 8 | 17.4 | 72.9-74.9 | 33.4 | 61.9-63.1 | 50.69 | 53.7-54.5 |
| 9 | 14.8 | 71.0-72.5 | 30.9 | 62.8-64.1 | 50.05 | 53.1-53.8 |
| CP | | | | | | |
| 1 | 9.6 | 77.5-79.8 | 28.5 | 66.5-67.8 | 55.68 | 48.8-50.9 |
| 2 | 9.5 | 78.0-80.5 | 24.9 | 64.5-66.0 | 51.88 | 51.1-51.5 |
| 3 | 9.7 | 77.1-79.2 | 27.3 | 63.5-65.0 | 51.22 | 51.7-52.0 |
| 4 | 14 | 65.5-67.1 | 38.8 | 61.5-62.5 | 52.99 | 52.7-53.4 |
| 5 | 9.9 | 74.5-78.5 | 26.5 | 65.6-67.1 | 53.81 | 54.1-54.5 |
| 6 | 15.9 | 63.5-65.5 | 40.4 | 60.9-61.9 | 51.72 | 54.1-54.5 |

TABLE 1-continued

| | Evaporation vessel | | | | | |
|---|---|---|---|---|---|---|
| | First | | Second | | Third | |
| | Con.[1] (wt. %) | Temp. (° C.) | Con.[2] (wt. %) | Temp. (° C.) | Con.[3] (wt. %) | Temp. (° C.) |
| 7 | 14.9 | 64.5-65.5 | 40.5 | 59.5-61.6 | 54.00 | 55.2-56.2 |
| 8 | 9.5 | 77.3-78.4 | 23.6 | 67.1-68.3 | 52.10 | 57.1-57.4 |
| 9 | 8.7 | 78.8-79.5 | 14.4 | 65.7-67.1 | 52.15 | 55.3-55.9 |

Con.[1]: the concentration of the first concentrated aqueous NMMO solution
Con.[2]: the concentration of the second concentrated aqueous NMMO solution
Con.[3]: the concentration of the third concentrated aqueous NMMO solution

TABLE 2

| | $V_1$ (ton) | $C_1$ (wt %) | $V_2$ (ton) | $C_2$ (wt %) | Recovery efficiency (%) |
|---|---|---|---|---|---|
| Exp. | | | | | |
| 1 | 11835 | 3.92 | 925.5 | 50.05 | 99.84 |
| 2 | 10917 | 5.15 | 1054.5 | 50.25 | 94.25 |
| 3 | 12600 | 4.35 | 1013.7 | 50.95 | 94.23 |
| 4 | 10056 | 4.15 | 808.8 | 50.58 | 98.03 |
| 5 | 10533 | 4.59 | 924.5 | 50.36 | 96.30 |
| 6 | 7427 | 3.78 | 536.7 | 50.06 | 95.70 |
| 7 | 13335 | 4.01 | 1002.9 | 50.80 | 95.28 |
| 8 | 11929 | 5.00 | 1105.9 | 50.69 | 93.99 |
| 9 | 14670 | 4.10 | 1109.9 | 50.05 | 92.36 |
| CP | | | | | |
| 1 | 11523 | 2.99 | 538.3 | 55.68 | 87.00 |
| 2 | 5190 | 4.50 | 382.6 | 51.88 | 84.99 |
| 3 | 10964 | 2.90 | 522.1 | 51.22 | 84.11 |
| 4 | 11724 | 3.99 | 733.8 | 52.99 | 83.12 |
| 5 | 10914 | 2.80 | 458.8 | 53.81 | 80.79 |
| 6 | 9797 | 4.01 | 573.5 | 51.72 | 75.50 |
| 7 | 9846 | 3.85 | 530.6 | 54.00 | 75.59 |
| 8 | 10968 | 2.99 | 509.3 | 52.10 | 80.91 |
| 9 | 10764 | 4.72 | 820.7 | 52.15 | 84.24 |

Figure 4:
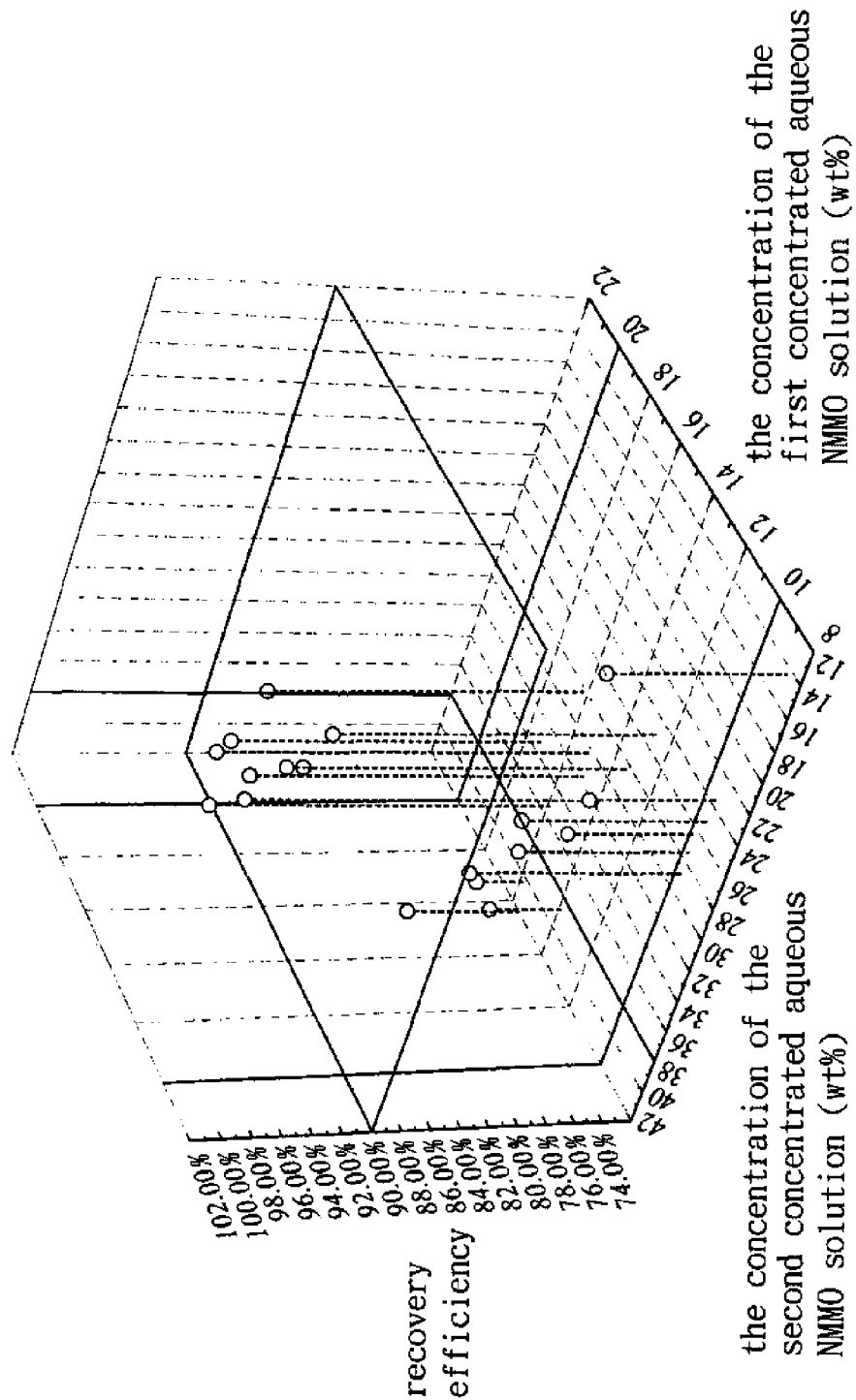
FIG. 4 shows the relationship among the concentrations of the aqueous NMMO solutions that are concentrated in first and second evaporation vessels and the recovering efficiency.

As shown in Table 2 and FIG. 4, the recovery efficiency of each of the Examples 1-9 is higher than that of each of the Comparative examples 1-9, when the concentration of the first concentrated aqueous NMMO solution falls within a range of 10 wt % to 20 wt %, and the concentration of the second concentrated aqueous NMMO solution falls within a range of 22 wt % to 38 wt %.

It is worth mentioning that the method of recovering and concentrating an aqueous NMMO solution of this invention is energy conserving. To be specific, in the conventional method, 1 ton of water vapor can be used to treat about 2 tons of the aqueous NMMO solution. However, in this invention, 1 ton of water vapor can be used to treat about 60 tons of the aqueous NMMO solution.

According to the present invention, when the concentrations of the first and second concentrated aqueous NMMO solutions are specifically controlled, the efficiency of recovering and concentrating the aqueous NMMO solution to a concentration of up to 50 wt % can be improved. Further, by virtue of the recycling of the water vapor produced from the third evaporation vessel 61 and by preheating the to-be-concentrated aqueous NMMO solution in a feeding pipe 2 using the heat conducted from the first, second and third vapor tanks 43, 53, 63 and the heat exchanger 3, energy consumption can be reduced in this invention.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A method of recovering and concentrating an aqueous N-methylmorpholine-N-oxide (NMMO) solution, comprising the steps of:
   (a) introducing an aqueous NMMO solution, which has an NMMO concentration of less than 10 wt %, into a triple effect evaporator that includes serially connected first, second and third evaporation vessels;
   (b) concentrating the aqueous NMMO solution to obtain a first concentrated aqueous NMMO solution having an NMMO concentration ranging from 10 wt % to 20 wt % using the first evaporation vessel, and transferring the first concentrated aqueous NMMO solution to the second evaporation vessel;
   (c) concentrating the first concentrated aqueous NMMO solution to obtain a second concentrated aqueous NMMO solution having an NMMO concentration ranging from 22 wt % to 38 wt % using the second evaporation vessel, and transferring the second concentrated aqueous NMMO solution to the third evaporation vessel; and
   (d) concentrating the second concentrated aqueous NMMO solution to obtain a third concentrated aqueous NMMO solution having an NMMO concentration higher than 50 wt % using the third evaporation vessel.

2. The method of recovering and concentrating an aqueous NMMO solution as claimed in claim 1, further comprising (e) compressing water vapor produced in step (d), and introducing the compressed water vapor into the first evaporation vessel for recycling.

* * * * *